United States Patent Office 3,234,188
Patented Feb. 8, 1966

3,234,188
CURED POLYMERIC MERCAPTANS AND PROCESS
Paul F. Warner, Phillips, Tex., assignor to Phillips Petroleum Company, a corporation of Delaware
No Drawing. Filed Apr. 27, 1961, Ser. No. 105,884
6 Claims. (Cl. 260—79)

This invention relates to compounding of liquid polymers. In accordance with one aspect, this invention relates to novel curable liquid polymeric mercaptan compositions. In accordance with another aspect, this invention relates to novel air-cured polymeric mercaptan compositions. In accordance with a further aspect, this invention relates to a process for the production of cured liquid polymeric mercaptans that can be used as calking compounds, sealing materials, adhesives, and the like.

Sealant compositions which can be converted to rubbery, oil-resistant solids under mild conditions of cure are of interest where products are desired which have joints or seams therein which, of necessity, must be watertight, gas-tight or resistant to hydrocarbon solvents. A particularly important and exacting application for sealants of this type is found in the aircraft industry where efficient calking of aluminum seams is required in the fabrication of fuel cells or bunkers. Such sealants are used along the seams joining the aluminum sheet stock and in the holes where rivets are to be placed. Sealants used in such applications must be flexible over a wide temperature range, resistant to hydrocarbon solvents and capable of being easily applied. Such sealants can also be used for the glass-to-metal seal in the windows of aircraft. Also, such sealants are useful for binding solid propellants in rockets.

Various materials have either been used or proposed for such applications. However, many of these known materials, while being generally satisfactory, have some serious drawbacks which have brought about a search for materials which can be substituted therefor. For example, some of the known materials have bubbles of entrapped air or water therein which are formed within the sealant during the curing reaction. Also, some of these materials have relatively poor properties regarding tensile strength, etc.

Accordingly, an object of this invention is to provide a novel sealant composition.

A further object of this invention is to provide an air-curable liquid polymeric mercaptan composition.

A further object of this invention is to provide a process for curing a liquid polymeric mercaptan to a rubbery product utilizable as a calking compound, a fuel tank sealing compound, a rocket fuel binder, etc.

Other objects and advantages of my invention will be apparent to one skilled in the art upon reading the accompanying disclosure.

According to this invention, these and other objects are broadly accomplished by a novel composition prepared by incorporating into a mercaptan derivative of a liquid diene polymer a sufficient amount of a vulcanizing agent to effect cure of said polymer when the mixture is subjected to curing conditions.

More specifically, according to the invention I have found that certain rubber curing systems, for example, lead peroxide plus stearic acid, sulfur plus an alkyl amine, etc., are effective for air-curing mercaptan derivatives of liquid conjugated diene polymers, especially polybutadiene, to rubbery products utilizable as calking compounds, tank sealing compounds, rocket fuel binders, and the like.

The unvulcanized or uncured liquid polymeric mercaptans employed in the preparation of the vulcanized or cured products according to the invention are prepared by reacting an unsaturated liquid diene polymer, such as a conjugated diene homopolymer or copolymer, with $H_2S$ at an elevated temperature in the presence of a solid contact catalyst, preferably a cobalt molybdate catalyst. The liquid polymeric mercaptans cured according to the invention and their preparation are set forth and claimed in my copending application having Serial No. 845,602, filed October 12, 1959, now U.S. 3,051,695.

As set forth in said application, the highly unsaturated diene polymers which can be sulfurized with $H_2S$ are preferably the liquid homopolymers and copolymers of conjugated dienes, such as 1,3-butadiene, preferably formed by reaction in the presence of an alkali metal catalyst and a suitable diluent at controlled conditions of temperature and pressure, as is well known in the art, such as disclosed and claimed by U.S. Patent 2,631,175, Willie W. Crouch, patented March 10, 1953. Suitable catalyst that can be employed for preparation of liquid diene polymers include the finely divided alkali metal and/or alkali metal hydrides, such as sodium, potassium, lithium, sodium hydride, potassium hydride, lithium hydride, and the like. Reaction of the liquid diene polymer with $H_2S$ in the presence of a catalyst is ordinarily carried out at elevated pressures sufficient to maintain liquid conditions in the reaction zone and an elevated temperature of the order of about 450° F.

Liquid diene polymers having average molecular weights generally in the range from 1000 to 3000 are suitable for reaction with $H_2S$. These polymers are highly unsaturated and then unsaturation has been found to be in the neighborhood of about 30 double bonds per molecule if a molecular weight of 2000 is assumed. The principal reaction occurring is believed to be the addition of $H_2S$ to the olefinic linkages so that at least it is theoretically possible to add 1 mol of $H_2S$ per butadiene unit in the polymer chain. The average molecular weight of liquid polybutadiene is about 1500 or, in other words, 28 mols of butadiene reacted to make 1 mol of polymer. Theoretically, 28 mols of $H_2S$ are capable of reacting with each molecule of polymer.

Liquid diene polymers having up to about 30 weight percent combined sulfur can be cured according to the invention. Liquid polymers having sulfur contents of 3.15 and 9.18 weight percent have been prepared by adding hydrogen sulfide to liquid polybutadiene using a cobalt molybdate type catalyst. A sulfur content of about 9 weight percent indicates that from about 25 to 30 percent of the double bonds in the polymer have been reacted with sulfur. However, it is not known whether the sulfur is affixed in the form of sulfides or sulfhydryl groups; presumably both are present. However, I do not wish to be limited to any particular theory of reaction.

According to the invention, liquid polymeric mercaptans such as prepared according to my copending application, supra, are cured to rubbery products by incorporating therein a suitable vulcanizing agent, preferably together with an activator, subjecting the mixture to curing conditions, and then recovering the cured rubbery product. Known vulcanizing methods and agents can be used to cure the liquid polymeric mercaptans according to the invention. I prefer to use sulfur as the vulcanizing agent. Activators are preferably employed along with the vulcanizing agent, especially when it is desired to effect cure at ambient conditions.

The amount of curing employed in the curing of the liquid conjugated diene polymeric mercaptans according to the invention is usually in the range from 5 to 15 parts by weight per 100 parts by weight of polymer with 8 to 12 parts by weight being preferred. The amount of organic activator employed is generally in the range from 0.5 to 8 parts by weight per 100 parts by weight polymer with 1 to 5 parts by weight being preferred.

The curing temperature employed will vary appreciably depending upon the particular curing agent and activator employed and the desired rate of cure. I have found that the liquid polymeric mercaptans employed according to the invention can be effectively cured to a rubbery product useful as a calking compound, sealant, etc. by air curing at room temperature at from about 2 to 48 hours when employing a vulcanizing agent and an organic activator. However, if an activator is not desired elevated temperatures can be employed up to say about 350° F. to speed up the cure. One particular effective formulation I have used for air curing the defined liquid polymeric mercaptans at room temperature comprises 10 weight parts sulfur and 5 weight parts monoethanol amine per 100 weight parts of polymeric mercaptan. Another formulation that I have used effectively for curing liquid polymeric mercaptans to rubbery products at room temperature comprises 8 weight parts of lead dioxide and 1 weight part stearic acid per 100 weight parts of polymer. Furthermore, I have employed various amounts of zinc oxide, zinc peroxide and lead dioxide with the above formulations to effect cure.

As indicated above, the compounding or curing ingredients employed according to the invention include a vulcanizing agent and preferably an activator. However, modifiers, plasticizers, antioxidants, etc. can be used if desired. It is also within the scope of this invention to incorporate extenders and fillers if desired. The particular compounding ingredients used will be dependent upon the desired physical properties of the cured composition.

The vucanizing agents that can be employed according to the invention include sulfur, p,p′-dibenzoyl quinone dioxime, para-quinone dioxime, magnesium oxide, lead dioxide, sulfur dichloride, alkyl phenol monosulfide, alkyl phenol disulfide, etc. Of the above vulcanizing agents I prefer to employ sulfur or lead dioxide (peroxide).

The vulcanization accelerator-activators that can be employed according to the invention include the alkyl amines such as monoethanolamine, diethanolamine, triethanolamine, di-n-butylamine, dibenzylamine, tetramethylene-pentamine, guanadines such as diphenyl guanadine, lead oxide, zinc oxide, magnesium oxide, dibutylammonium oleate, oleic acid, fatty acids such as stearic acid, rosin acids, zinc stearate, etc. Metallic oxides such as zinc oxide, magnesium oxide, litharge, and the like can be used in addition to acidic materials, for examples fatty acids such as stearic acid, or the alkyl amines, or the guanadines.

Although this invention is applicable to simple compounding recipes containing only the liquid polymeric mercaptan, a vulcanizing agent such as sulfur or a sulfur donor compound and an activator, a number of additives may be added to modify the final product. For example, the compound recipes can include reinforcing or mineral fillers such as carbon black, silica, titanium dioxide, zinc sulfide, calcium silicate, hydrated alumina or calcium carbonate. A plasticizer may also be present but is not mandatory.

As indicated above, the consistency of the vulcanized liquid conjugated diolefin polymeric mercaptan cured according to the invention will vary depending upon the viscosity and molecular weight of the polymer used, the amount of vulcanizing agent, accelerator, etc. employed during curing and the time and temperature of curing. These cured polymers range from fairly tough rubbery materials to soft tacky and very viscous semifluid products. The compositions of the invention prior to curing are sufficiently fluid as to be easily applied to a base to coat same. As indicated above the products produced according to the invention are suitable for various applications including gasket manufacture, calking compounds, linings for fuel tanks, rocket fuel binders, and the like.

The following examples illustrate compositions prepared according to this invention but should be considered as illustrative and not as limiting the invention.

*Example I*

A liquid diene polymeric mercaptan was prepared by reacting a liquid diene copolymer of butadiene and 2-methyl-5-vinylpyridine with hydrogen sulfide at a temperature of 500 to 520° F. and a pressure of 800 p.s.i.g. in the presence of a cobalt molybdate catalyst. The liquid diene copolymer (10 to 20 weight percent) was dissolved in an isoparaffinic hydrocarbon diluent and passed over the cobalt molybdate catalyst with $H_2S$. The sulfurized liquid polymer obtained as product had the following properties:

Sulfur, wt. percent _____ 9.18
Viscosity, cs at 210° F. _____ 487
Color, Gardner _____ 11

The liquid diene polymeric mercaptan obtained above was admixed with various curing formulations as set forth below and then subjected to curing conditions. The formulations employed were as follows:

| Formula | Parts by Weight | | |
|---|---|---|---|
| | A | B | C |
| Polymeric Mercaptan | 100 | 100 | 100 |
| Lead Dioxide | ---- | ---- | 8 |
| Stearic Acid | ---- | ---- | 1 |
| Sulfur | 10 | 10 | ---- |
| Monoethanol Amine | 5 | 5 | ---- |
| Zinc Oxide | ---- | 5 | ---- |

With each of the above curing systems, cure of the polymeric mercaptan was effected at room temperature. The diene polymeric mercaptan went from a viscous liquid to a non-flowing, rubbery solid in from 2 to 48 hours. The polymeric mercaptan cured according to Formulation B was applied to a metal base and was found to have excellent adhesion properties, thus rendering this material an excellent calking and sealing compound.

As will be evident to those skilled in the art, various modifications of this invention can be made or followed in the light of this disclosure and discussion without departing from the spirit or scope of this disclosure or from the scope of the claims.

I claim:

1. A sealant composition formed by combining a liquid polymeric mercaptan of polybutadiene having up to about 30 weight percent combined sulfur, 5 to 15 parts by weight of a sulfur vulcanization agent per 100 parts of polymeric mercaptan and 0.5 to 8 parts by weight of an alkyl amine activator per 100 parts of polymeric mercaptan.

2. A composition according to claim 1 which contains 10 weight parts sulfur, 5 weight parts monoethanol amine and 5 weight parts of zinc oxide per 100 weight parts of polymeric mercaptan.

3. A composition according to claim 1 containing 10 weight parts sulfur and 5 weight parts monoethanol amine per 100 weight parts of polymeric mercaptan.

4. A sulfur cured rubbery butadiene-2-methyl-5-vinylpyridine copolymeric mercaptan.

5. A process for air curing a liquid polybutadiene mercaptan which comprises incorporating a vulcanizing amount of a sulfur vulcanizing agent and an effective amount of an activator into said mercaptan and then allowing said mixture to air cure.

6. A process according to claim 5 wherein from 5 to 15 weight parts of sulfur and from 0.5 to 8 weight parts of an alkyl amine are incorporated into said polymeric mercaptan.

References Cited by the Examiner

UNITED STATES PATENTS

| | | | |
|---|---|---|---|
| 2,137,584 | 11/1938 | Ott | 260—79.5 |
| 2,831,896 | 4/1958 | Holly | 260—79 XR |
| 2,964,502 | 12/1960 | Wheelock | 260—79 |
| 3,025,273 | 3/1962 | Wheelock | 260—79 |
| 3,030,344 | 4/1962 | Argabright et al. | 260—79 |
| 3,036,056 | 5/1962 | Rion | 260—94.7 |
| 3,047,544 | 7/1962 | Byrd | 260—79 |
| 3,051,695 | 8/1962 | Warner et al. | 260—609 |
| 3,127,379 | 3/1964 | Natto et al. | 260—79.5 |

OTHER REFERENCES

Whitby, G. S.: Synthetic Rubber, N.Y., John Wiley and Sons, 1954, page 394.

Jorczak et al.: Industrial and Engineering Chemistry 41, 1951, pages 326–327.

Fisher: Industrial and Engineering Chemistry, vol. 31, pages 1381–89, November 1939.

Reid: Organic Chemistry of Bivalent Sulfur, vol. 1 pages 118–124 and 141 (c) 1958.

LEON J. BERCOVITZ, *Primary Examiner.*

M. LIEBMAN, *Examiner.*